(12) United States Patent  
Ohashi et al.

(10) Patent No.: US 6,332,371 B1
(45) Date of Patent: Dec. 25, 2001

(54) PARALLEL SHAFT TRANSMISSION (75) Inventors: Tatsuyuki Ohashi; Tomonari Shirai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/583,234

(22) Filed: May 31, 2000

(30) Foreign Application Priority Data

Jun. 7, 1999 (JP) .................................................. 11-159120

(51) Int. Cl.⁷ .................................................. F16H 3/093
(52) U.S. Cl. .................................................. 74/331
(58) Field of Search .............................. 74/331, 329, 359, 74/360, 361

(56) References Cited

U.S. PATENT DOCUMENTS

| 4,570,503 | * | 2/1986 | Theobald | 74/331 |
| 4,627,302 | * | 12/1986 | Laylock et al. | 74/360 |
| 5,081,878 | * | 1/1992 | Stasiuk | 74/360 |
| 5,445,041 | * | 8/1995 | Zaiser et al. | 74/331 |
| 6,186,029 | * | 2/2001 | McQuinn | 74/331 |

FOREIGN PATENT DOCUMENTS 57-103955  6/1982  (JP) .
4-331852  11/1992  (JP) .

* cited by examiner

*Primary Examiner*—Charles A Marmor
*Assistant Examiner*—Ankur Parekh
(74) *Attorney, Agent, or Firm*—Arent Fox Kintner Plotkin & Kahn, PLLC (57) ABSTRACT A parallel shaft transmission comprising: an input shaft 1, first counter shaft 2, second counter shaft 3, output shaft 4 that are parallel to each other; set of two first change gear trains 21a, 22a, 21b, 22b disposed between the input shaft 1 and first conter shaft 2; first and second clutch means 11, 12 for connecting and disconnecting the input shaft 1 and first change drive gear; set of two second change gear trains 22a, 23a, 22c, 23c disposed between the first counter shaft 2 and second counter shaft 3; third and fourth clutch means for connecting ad disconnecting the second counter shaft 3 and second change driven gear; third change gear trains 23d, 24d disposed between the second counter shaft 3 and output shaft 4; and fifth clutch means 15 for connecting and disconnecting the first counter shaft 2 and output shaft 4.

5 Claims, 10 Drawing Sheets

(LOW)

(REV)

PARALLEL SHAFT TRANSMISSION

FIELD OF THE INVENTION

The present invention relates to a parallel shaft transmission wherein a plurality of gear trains are disposed between shafts established parallel to each other, and each gear train has a plurality of clutching means for selecting the gear train to effect power transmission.

BACKGROUND OF THE INVENTION

Parallel shaft transmissions with such a constitution have had many uses such as in automobile transmissions. For example, parallel shaft automatic transmissions are disclosed in Japanese Patent Laid-open No. 57-103955(A) and Japanese Patent Laid-open No. 4-331852(A).

However, these parallel shaft transmissions have constitutions wherein a plurality of gear trains for engaging with each other are disposed parallel to the shafts and between the parallel shafts, and the gear train for effecting power transmission is selected by the connection and disconnection of a plurality of clutches disposed adjacent to the gears constituting each gear train. Therefore, the tendency is for the axial dimension of the transmission to increase; this tendency increases as the number of speeds increases. Particularly in automobile transmissions, the number of hydraulic clutches corresponds to the number of speeds, but hydraulic clutches structurally have relatively large axial and radial dimensions, and it is easy for the transmission to become large.

Also, in recent years, automobile transmissions have tended to have a greater number of speeds because of the demands for drivability and improvements in fuel consumption. Three speed transmissions changed to four speed transmissions; once five speed transmissions came into use, six speed transmissions were requested because of further demands for drivability and improvements in fuel consumption. This is consequently a situation where it is easy for transmissions to become larger and larger. Likewise, as the transmissions came to have larger numbers of speeds, the number of clutches increased and the increased size and weight of transmissions and consequent increases in manufacturing costs have become problematic.

SUMMARY OF THE INVENTION

It is an object of the present invention to provide a parallel shaft transmission having a constitution wherein the disposition of the gears and clutches is contrived so that the transmission can have an increased number of speeds and be as compact as possible.

The parallel shaft transmission relating to the present invention has the following constitution: an input shaft, first counter shaft, second counter shaft, and output shaft established on the same axis as the first counter shaft and able to rotate relatively thereto, with each established parallel to the others; set of two first change gear trains comprising first and second change drive gears (for example, first gear 21a and second gear 21b in FIG. 1 of the embodiment) established on the input shaft, and first and second change driven gears (for example, third gear 22a and fourth gear 22b in FIG. 1 of the embodiment), established on the first counter shaft, for engaging with first and second change drive gears; first and second clutch means (for example, first clutch 11 and second clutch 12 in FIG. 1 of the embodiment), established on the input shaft, for connecting and disconnecting the input shaft and the set of two first change drive gears; set of two second change gear trains comprising third and fourth change drive gears (for example, third gear 22a and fifth gear 22c in FIG. 1 of the embodiment) established on the first counter shaft, and third and fourth change driven gears (for example, sixth gear 23a and seventh gear 23c in FIG. 1 of the embodiment), established on the second counter shaft, for engaging with the third and fourth change drive gears; third and fourth clutch means (for example, the third clutch 13 and fourth clutch 14 in FIG. 1 of the embodiment), established on the second counter shaft, for connecting and disconnecting the second counter shaft and the set of two second change driven gears; third change gear train comprising a fifth change drive gear (for example, the eighth gear 23d in FIG. 1 of the embodiment) established on the second counter shaft, and fifth change driven gear (for example, the ninth gear 24d in FIG. 1 of the embodiment), established on the output shaft, for engaging with the fifth change drive gear; and fifth clutch means (for example, fifth clutch 15 in FIG. 1 of the embodiment), established between the first counter shaft and output shaft, for connecting and disconnecting the first counter shaft and output shaft.

In a parallel shaft transmission with such a constitution, the driving force transmitted from the engine to the input shaft is transmitted to the output shaft at a reduction ratio corresponding to the selected gear train, by means of a gear train such as the first change gear train, second change gear train, and third change gear train, through the selective connection and disconnection of each clutch means established on the input shaft and second counter shaft. Furthermore, by the connection and disconnection of the fifth clutch means established between the first counter shaft and output shaft, the driving force of the input shaft can be transmitted to the output shaft at the reduction ratio of the first gear train, without passing through the second gear train and third gear train. For this reason, a transmission with the same number of speeds can be constituted with a number of clutches less than the number of speeds, such as a six forward speed transmission constituted with five hydraulic clutches. Consequently, a parallel shaft transmission, with improved drivability and fuel consumption and with an increased number of speeds, can be provided without cost increases or increased size and weight of the transmission due to an increased number of clutches.

Moreover, a parallel shaft transmission can be constituted as follows: a reverse coupling gear train (for example, reverse gear trains 21r, 26, 22r in FIG. 1 of the embodiment) is established between the input shaft and first counter shaft; and a forward and reverse switching mechanism (for example, reverse selector 16 in FIG. 1 of the embodiment) is disposed on the input shaft. With this constitution, the clutch means (for example, second clutch 12 and third clutch 13 in FIG. 1 of the embodiment) disposed on the first counter shaft or second counter shaft can be used both for forward and reverse. For this reason, a transmission, with which forward and reverse are possible, can be constituted without increasing the number of clutch means and the size of the transmission, and a compact parallel shaft transmission can be provided.

Also, a parallel shaft transmission can be constituted as follows: a reverse coupling gear train is established between the input shaft and first counter shaft; and a forward and reverse switching mechanism (for example, the reverse clutch 46 in FIG. 9 of the embodiment and the reverse selector 86 in FIG. 10 of the embodiment) is disposed on the first counter shaft. With this constitution, the clutch means disposed on the first counter shaft or second counter shaft as above can be used both for forward and reverse, and a transmission, with which forward and reverse are possible, can be constituted without increases to transmission size. Furthermore, because the forward and reverse switching mechanism is disposed on an axis with few clutch means, increases to the axial dimensions can be minimized and a compact parallel shaft transmission can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
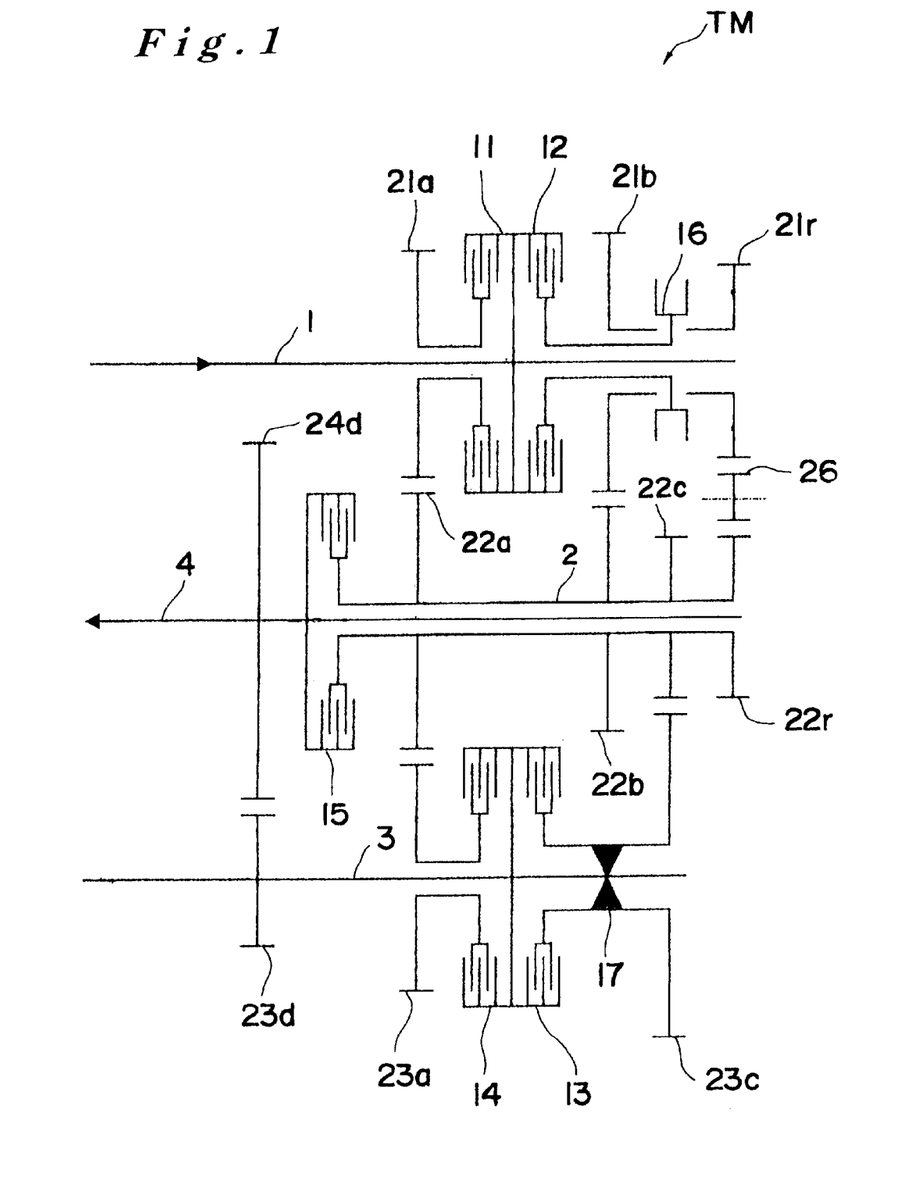
FIG. 1 is a skeleton view showing the power transmission constitution of a parallel shaft transmission relating to a first embodiment of the present invention.
Figure 2:
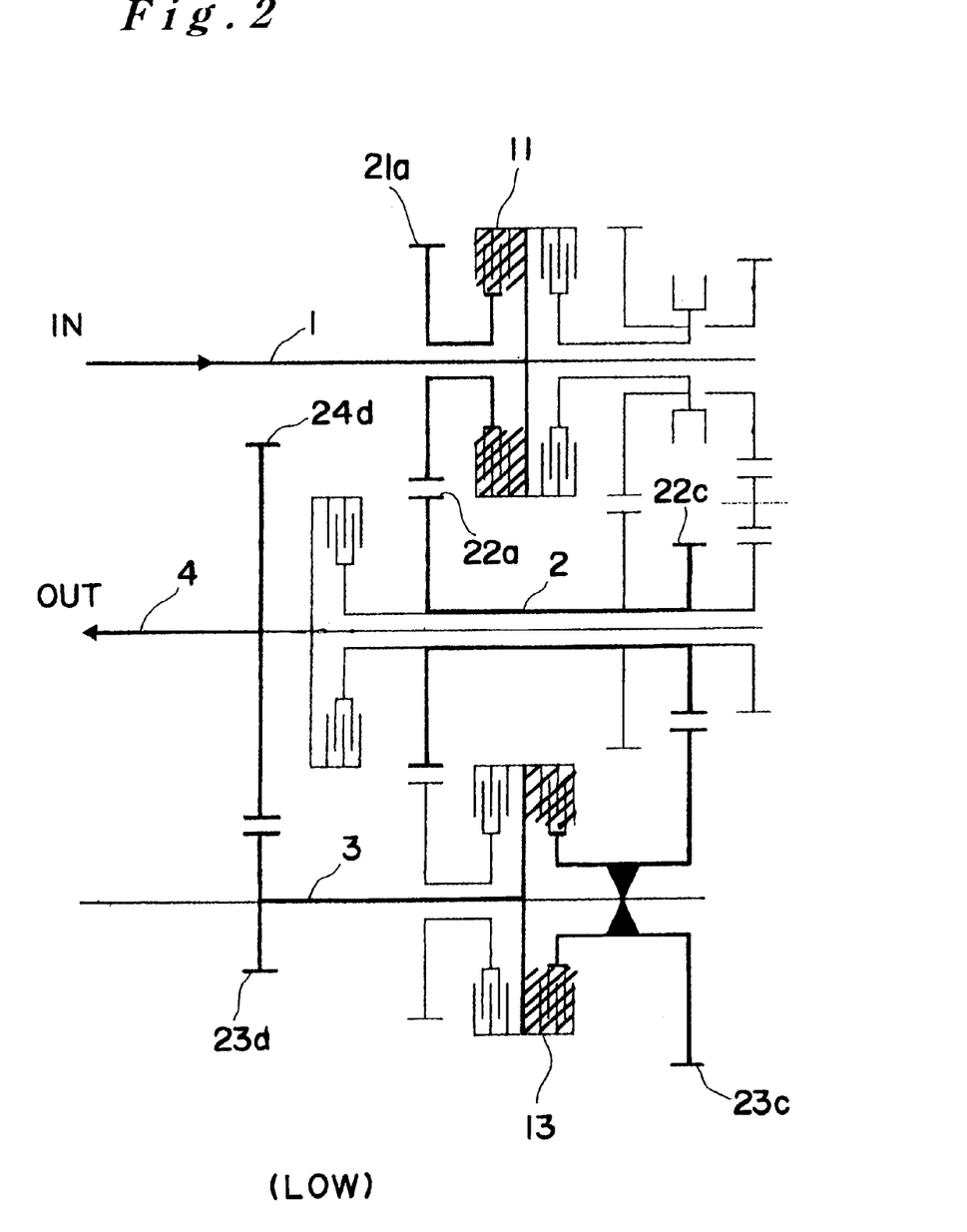
FIG. 2 is a skeleton view showing the power transmission path in LOW gear of a parallel shaft transmission relating to a first embodiment of the present invention.

FIG. 1 shows a first embodiment of the parallel shaft transmission relating to the present invention. In this parallel shaft transmission, driving force is transmitted from an engine output shaft of a vehicle, not shown, via a torque converter to the input shaft 1. After being converted at the desired gear ratio by the transmission mechanism TM of the parallel shaft transmission, the driving force is transferred to the right and left drive wheels of the vehicle via a differential mechanism connected to the output shaft 4 of this transmission mechanism TM.

The parallel shaft transmission mechanism TM comprises an input shaft 1, a first counter shaft 2, a second counter shaft 3, and an output shaft 4 that are parallel to each other. Among those, the first counter shaft 2 and output shaft 4 are disposed on the same axis and are constituted so as to rotate relatively to each other.

The input shaft 1 is supported rotatably by bearings, not shown, while the left end thereof in the FIG. is connected to the turbine of the torque converter; the input shaft receives driving force transmitted by the torque converter from the engine and rotates with the turbine of the converter. The first gear 21a, first clutch 11, second clutch 12, second gear 21b, reverse selector 16, and reverse drive gear 21r are disposed on the input shaft 1 in that order from the left side of the figure (torque converter side). The first gear 21a is disposed rotatably on the shaft of the input shaft 1 and is connected to and disconnected from the input shaft 1 by the hydraulically actuated first clutch 11. The second gear 21b and reverse drive gear 21r are disposed rotatably on the input shaft 1. Either gear is selected by the reverse selector 16 (for example, dog tooth clutch or servo-synchro mechanism) for switching between forward and reverse, while the selected gear is connected to and disconnected from the first shaft by the action of the second clutch 12.

The first counter shaft 2 is disposed coaxially to and so as to cover the outside of the output shaft 4 and is constituted so as to rotate relatively thereto due to a bearing, not shown, disposed between the output shaft 2 and the first counter shaft. The fifth clutch 15, third gear 22a, fourth gear 22b, fifth gear 22c, and reverse driven gear 22r are disposed on the shaft of the first counter shaft 2 in that order from the left side of the figure Each gear is joined with the second counter shaft 2 and rotates as one therewith. The fifth clutch 15 is hydraulically powered to connect and disconnect the second counter shaft 2 and output shaft 4 which rotate together.

The second counter shaft 2 is supported rotatably by bearings, not shown. The eighth gear 23d, sixth gear 23a, fourth clutch 14, third clutch 13, and seventh gear 23c are disposed on the axis thereof in order from the left side of the figure The sixth gear 23a and seventh gear 23c are disposed rotatably relative to the second counter shaft 3 and are each connected to and disconnected from the second counter shaft 3 by the hydraulically actuated fourth clutch 14 and third clutch 13. The eighth gear 23d is joined with the second counter shaft 3.

The output shaft 4 is supported rotatably with respect to the case of the transmission by bearings, not shown, while being disposed so as to rotate relatively to the first counter shaft 2 due to bearings, not shown, between the output shaft and the first counter shaft 2 disposed coaxially about the outside of this output shaft 4. A ninth gear 24d and fifth clutch 15 are disposed in that order from the left side of the figure on the axis of the output shaft; the ninth gear 24d is joined to the output shaft 4. The fifth clutch 15 connects and disconnects the output shaft 4 and first counter shaft 2 with hydraulic power.

Moreover, as shown, the first gear 21a engages with the third gear 22a and, the third gear 22a engages with the sixth gear 23a, the second gear 21b engages with the fourth gear 22b, the fifth gear 22c engages with the seventh gear 23c, and the eighth gear 23d engages with the ninth gear 23d. Furthermore, the reverse drive gear 21r engages with the reverse driven gear 22r via the reverse idler gear 26.

For a parallel shaft transmission with the abovementioned constitution, the setting of each gear and power transmission path thereof are explained with reference to FIGS. 2 through 8. Moreover, in this transmission, LOW (first), second, third, fourth, fifth, and sixth gears are established in the forward range (D range) and a reverse gear is established in the reverse range (R range). This range switching is effected as follows: switching to forward range is accomplished by moving the reverse selector 16 to the left in the figure and engaging the second gear and input shaft 1; switching to the reverse range is accomplished by moving the reverse selector 16 to the right in the figure and engaging the reverse drive gear 21r and the input shaft 1.

Each gear in the forward range is explained next. Low gear is established by engaging the first clutch 11 and the third clutch 13; the power transmission path in this case is shown with the bold lines in FIG. 2. Transmitted from the engine via the torque converter to the input shaft 1, the rotary driving force is transmitted to the first gear 21a by the engagement of the first clutch 11 and rotates the first gear 21a with the input shaft; the third gear 22a engaged with the first gear 21a is caused to rotate; and the first counter shaft 2 is driven. Because each gear on the first counter shaft (third gear 22a, fourth gear 22b, fifth gear 22c) is joined to the first counter shaft 2, the seventh gear 23c engaged with the fifth gear 22c is therefore rotated and the rotary driving force is transmitted to the second counter shaft 3 due to the engagement of the third clutch 13. The eighth gear 23d is joined to the second counter shaft 3, the rotary driving force transmitted to this gear drives the ninth gear 23d engaged with the eighth gear 23d, and the rotary driving force is transmitted to the output shaft 4.

Figure 3:
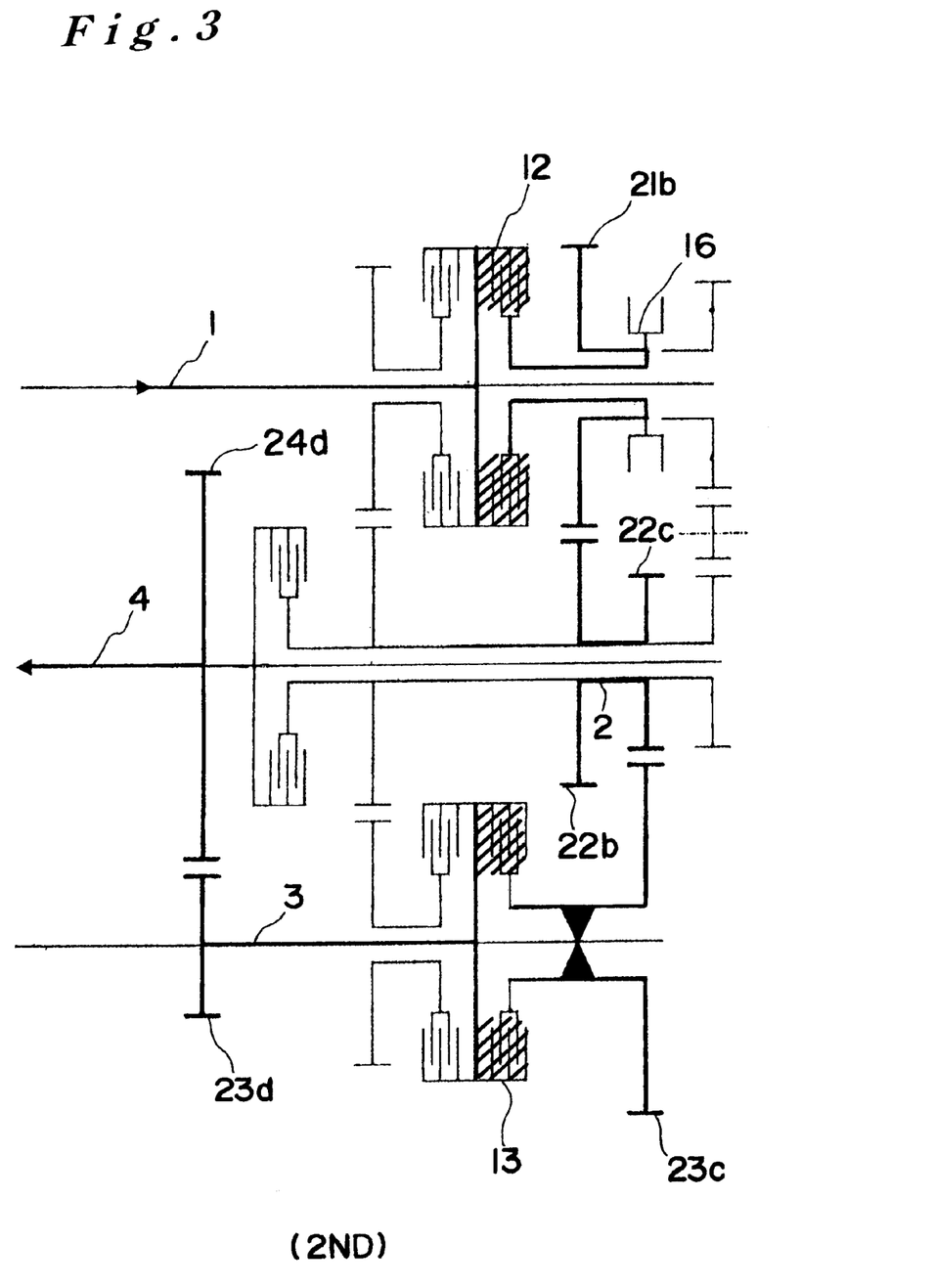
FIG. 3 is a skeleton view showing the power transmission path in second gear of a parallel shaft transmission relating to a first embodiment of the present invention.

Second gear is established by engaging the second clutch 12 and the third clutch 13; the power transmission path in this case is shown with the bold line in FIG. 3. In forward gear, because the reverse selector 16 is moved to the left and the second gear 21b and second clutch 12 are engaged. Therefore, the rotary driving force transmitted from the engine via the torque converter to the input shaft 1 is transmitted to the second gear due to the engagement of the second clutch 12 and rotates the first counter shaft 2 via the fourth gear 22b engaged therewith. The subsequent transmission paths are the same as in first gear; the rotary driving force transmitted to the first counter shaft 2 is transmitted to the second counter shaft 3 by the engagement of the third clutch 13 via the fifth gear 22c attached to the shaft and the seventh gear 23c engaged therewith; the rotary driving force is transmitted to the output shaft 4 via the eighth gear 23d on that shaft and the ninth gear 24d engaged therewith.

Figure 4:
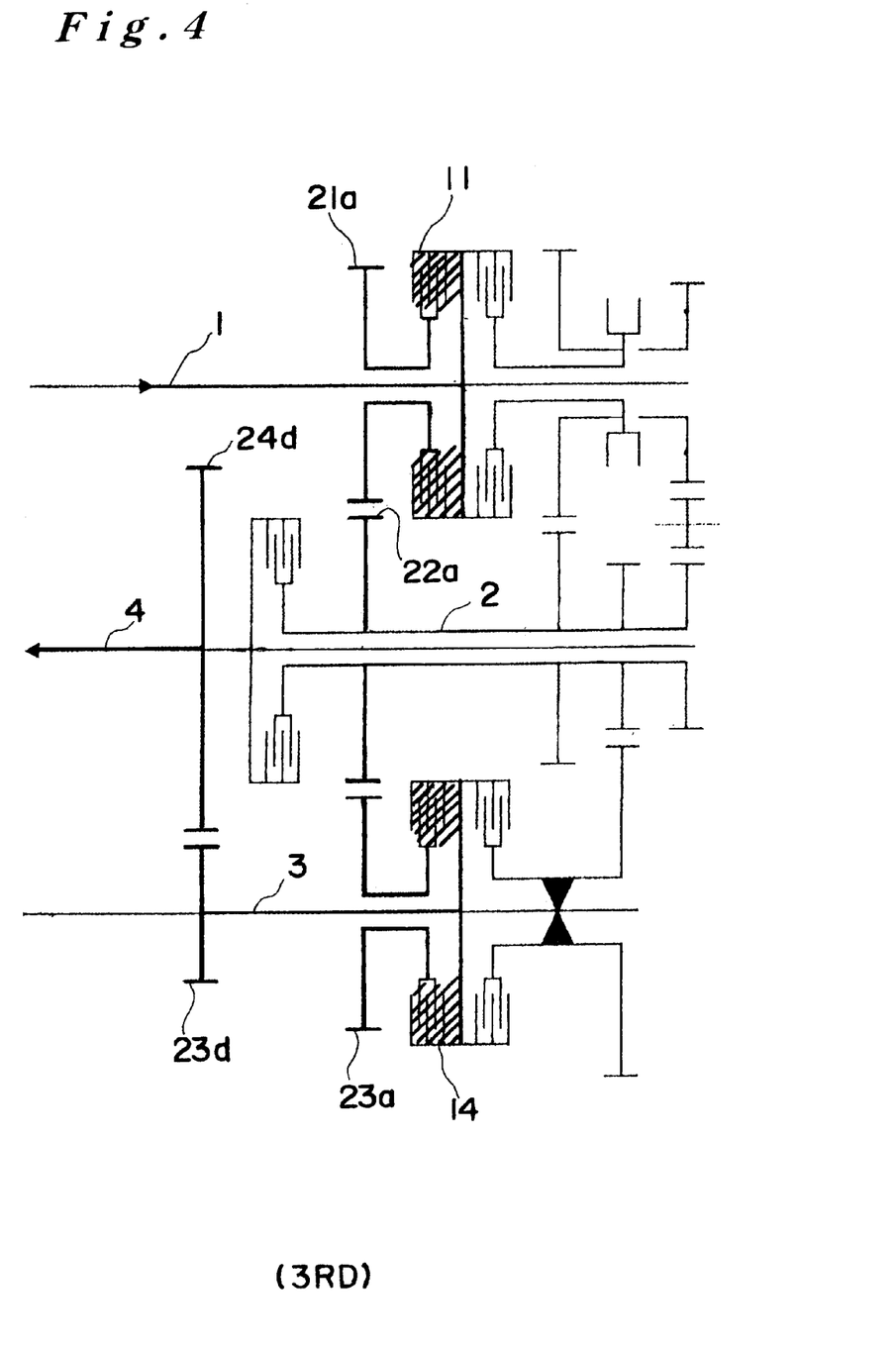
FIG. 4 is a skeleton view showing the power transmission path in third gear of a parallel shaft transmission relating to a first embodiment of the present invention.

Third gear is established by engaging the first clutch 11 and the fourth clutch 14; the power transmission path in this case is shown with the bold line in FIG. 4. Transmitted from the engine via the torque converter to the input shaft 1, the rotary driving force is transmitted to the first gear 21a by the engagement of the first clutch 11, rotates the third gear 22a engaged with the first gear 21a, and is transmitted to the first counter shaft 2. The third gear 22a engages with the sixth gear 23a on the second counter shaft as well; the rotary driving force is transmitted to the second counter shaft 3 by the engagement of the fourth clutch 14. The driving force goes through the eighth gear 23d joined with the second counter shaft, the ninth gear 24d, engaged with this gear, is driven, and the rotary driving force is transmitted to the output shaft 4.

Figure 5:
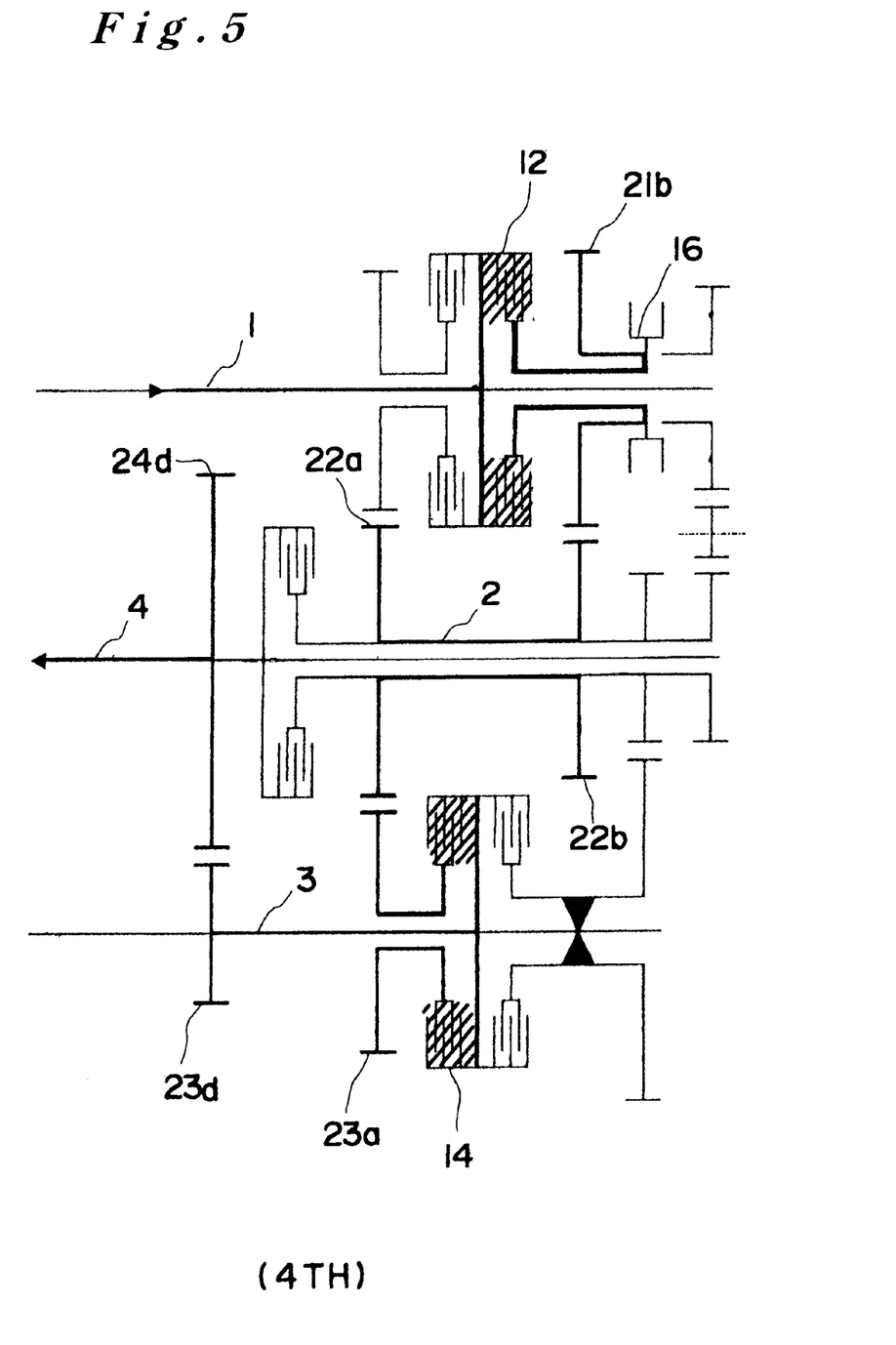
FIG. 5 is a skeleton view showing the power transmission path in fourth gear of a parallel shaft transmission relating to a first embodiment of the present invention.

Fourth gear is established by engaging the second clutch 12 and fourth clutch 14; the power transmission path in this case is shown with the bold line in FIG. 5. Transmitted from the engine via the torque converter to the input shaft 1, the rotary driving force is transmitted to the second gear 21b by the engagement of the second clutch 12 and is transmitted to the first counter shaft 2 by rotating the fourth gear 22b, engaged therewith. Because each gear on the first counter shaft is joined therewith, the third gear 22a on this shaft is rotated and the sixth gear 23a engaged therewith is rotated. With the engagement of the fourth clutch 14, the rotary driving force is transmitted to the second counter shaft 3. The driving force goes through the eighth gear 23d joined with the second counter shaft, the ninth gear 24d, engaged with this gear, is driven, and the rotary driving force is transmitted to the output shaft 4.

Figure 6:
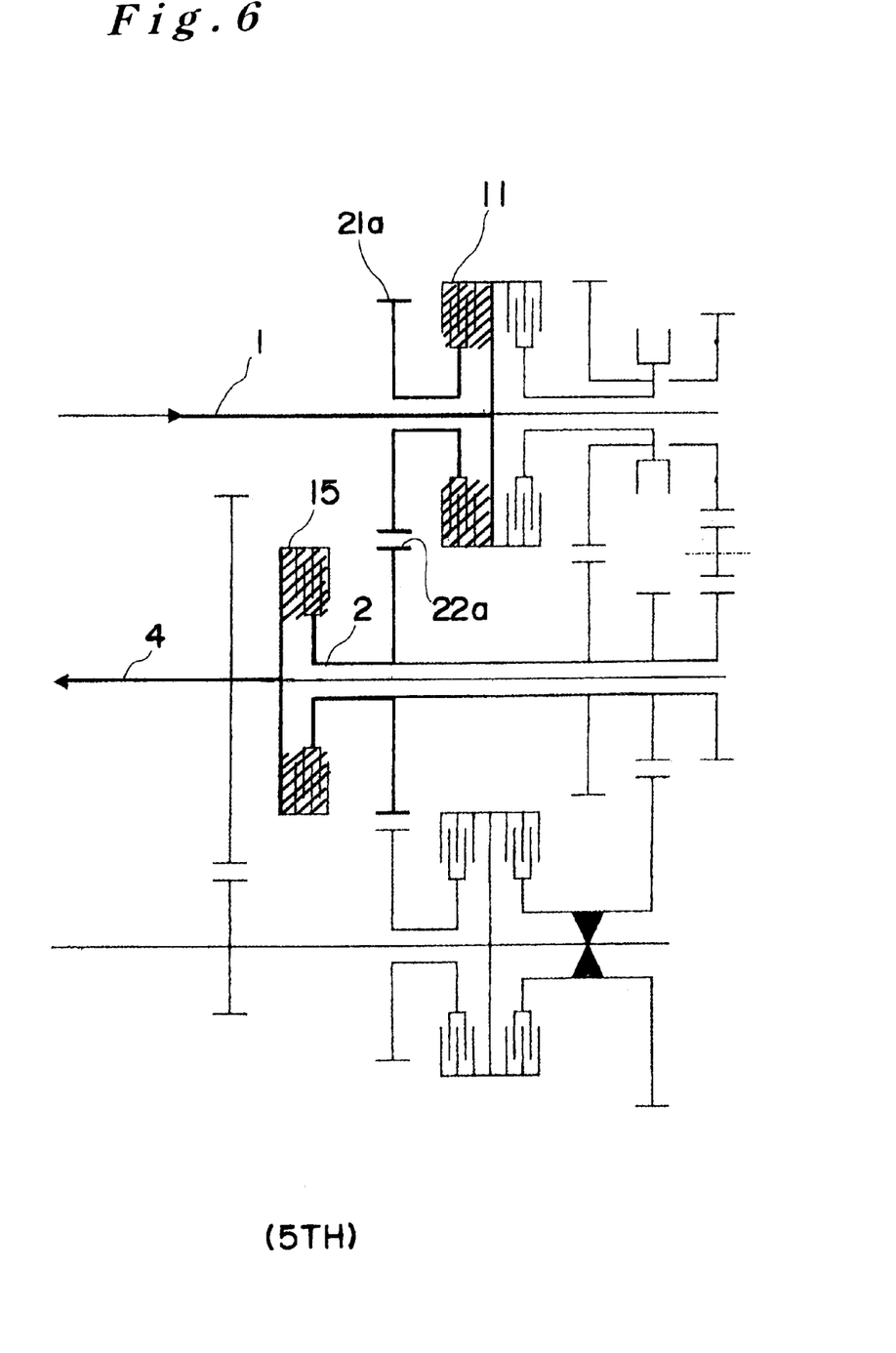
FIG. 6 is a skeleton view showing the power transmission path in fifth gear of a parallel shaft transmission relating to a first embodiment of the present invention.

Fifth gear is established by engaging the first clutch 11 and fifth clutch 15; the power transmission path in this case is shown with the bold line in FIG. 6. Transmitted from the engine via the torque converter to the input shaft 1, the rotary driving force is transmitted to the first gear 21a by the engagement of the first clutch 11 and is transmitted to the first counter shaft 2 by rotating the third gear 22a engaged therewith. Then the fifth clutch 15 causes the engagement of the first counter shaft 2 and output shaft 4, and the output shaft 4 is rotated at the same frequency as the first counter shaft 2.

Figure 7:
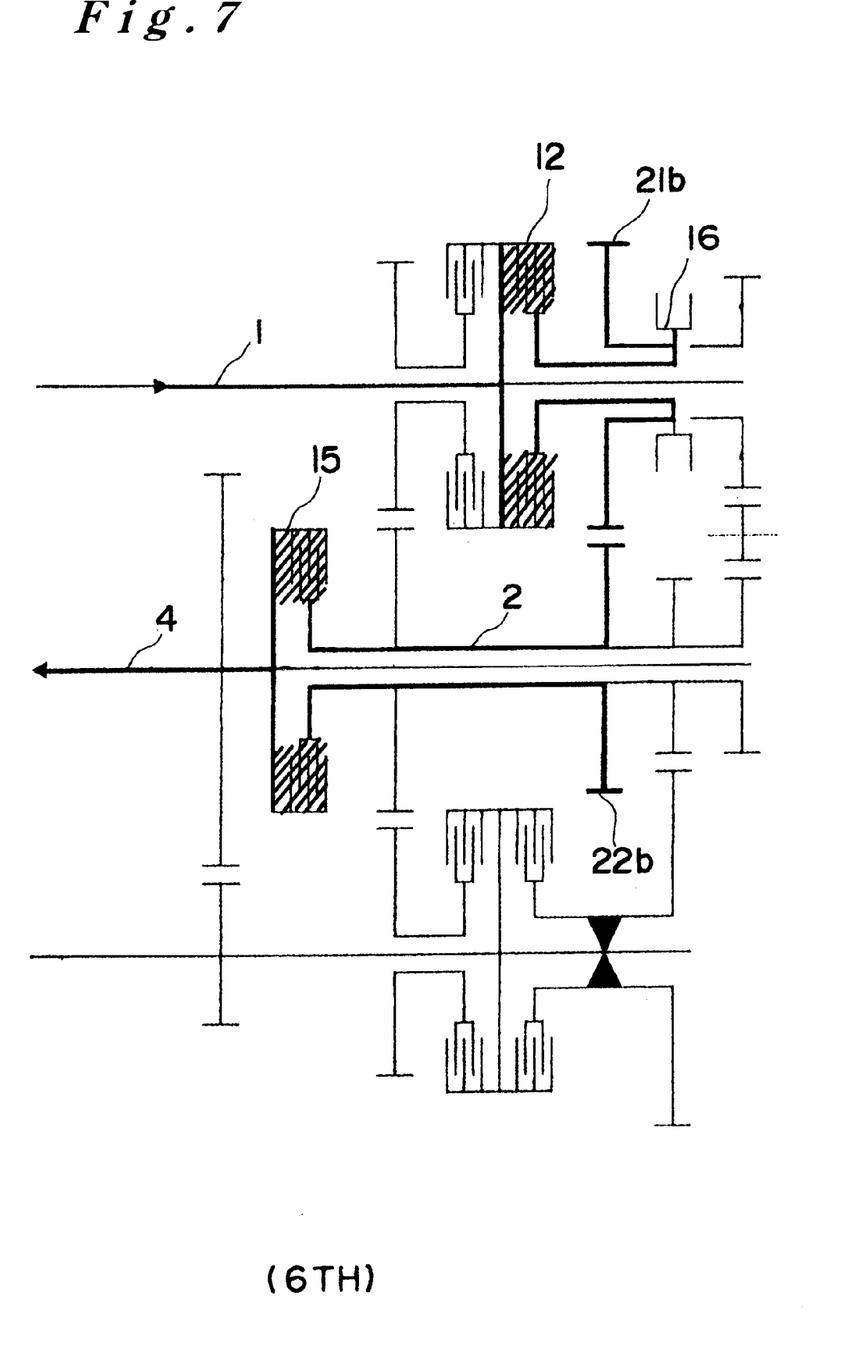
FIG. 7 is a skeleton view showing the power transmission path in sixth gear of a parallel shaft transmission relating to a first embodiment of the present invention.
Figure 8:
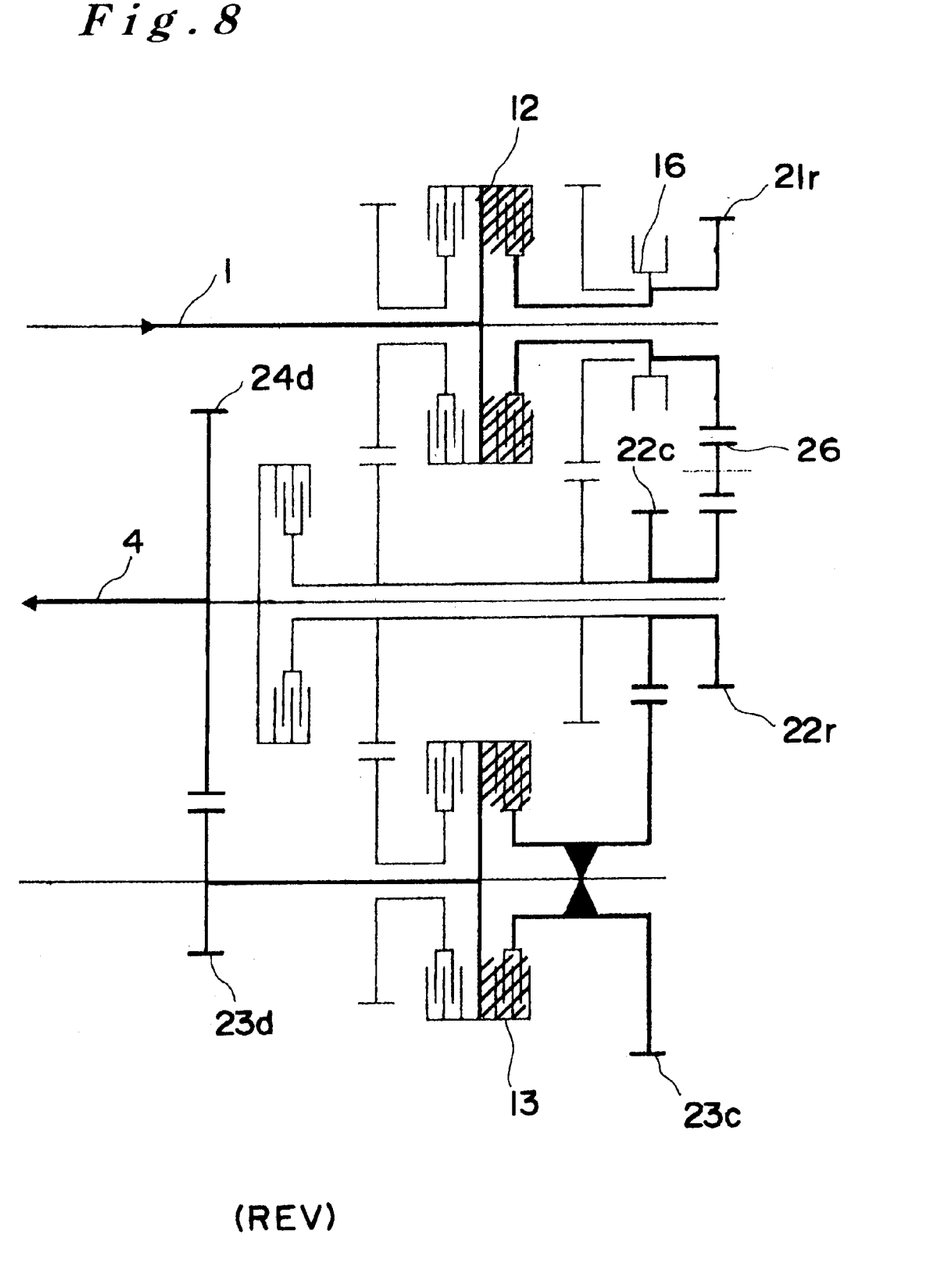
FIG. 8 is a skeleton view showing the power transmission path in reverse gear (reverse gear) of a parallel shaft transmission relating to a first embodiment of the present invention.

Sixth gear is established by engaging the second clutch 12 and fifth clutch 15; the power transmission path in this case is shown with the bold line in FIG. 7. Transmitted from the engine via the torque converter to the input shaft 1, the rotary driving force is transmitted to the second gear 21b by the engagement of the second clutch 12 and is transmitted to the first counter shaft 2 by rotating the fourth gear 22b engaged therewith. The fifth clutch 15 effects the engagement of the first counter shaft 2 and output shaft 4; the output shaft 4 is rotated at the same frequency as the first counter shaft 2.

Next, reverse gear is explained. Reverse gear is established by moving the reverse selector 16 to the right and engaging the second clutch 12 and the reverse drive gear 21r, while engaging the second clutch 12 and third clutch 13. The power transmission path for this case is shown with the bold line in FIG. 8. Transmitted from the engine via the torque converter to the input shaft 1, the rotary driving force is transmitted to the reverse drive gear 21r by the engagement of the second clutch 12, rotates the reverse driven gear 22r via the reverse idler gear engaged with both, and causes the first counter shaft 2 to rotate in the opposite direction from the forward speeds. The rotary driving force transmitted to the, first counter shaft 2 is transmitted to the second counter shaft 3 by the engagement of the third clutch 13 via the fifth gear 22c attached to the shaft and the seventh gear 23c engaged therewith; the rotary driving force, with a direction opposite to the forward speeds, is transmitted to the output shaft 4 via the eighth gear 23d on that shaft and the ninth gear 24d engaged therewith. As understood from this, the second clutch and third clutch also operate as reverse gear clutches.

In a parallel shaft transmission with the abovementioned constitution, the rotary driving force transmitted from the engine via a torque converter constitutes four forward gears via the second counter shaft 3 by the selective connection and disconnection of the first clutch 11, second clutch 12, third clutch 13, and fourth clutch 14 established on the output shaft 1 sic and second counter shaft, constitutes two forward gears, without passing through the second counter shaft, by the connection and disconnection of the fifth clutch 15 established between the first counter shaft 1 and output shaft 4, and constitutes a parallel shaft transmission with six forward gears with a total of five hydraulic clutches. For this reason, a transmission with a greater number of gears can be constituted with a smaller number of clutches, and consequently a compact transmission can be provided, as compared to a conventional transmission having a hydraulic clutch for each gear.

Furthermore, with the parallel shaft transmission in the abovementioned embodiment, the second clutch 12 and third clutch 13 double for forward and reverse speeds. A total of seven speeds, including the six forward gears and reverse (furthermore, it is also possible to have a total of nine gears, with three reverse gears through the engagement of the second clutch 12, fourth clutch 14, and fifth clutch 15) are accomplished with five hydraulic clutches. For this reason, a transmission with many gears including reverse can be constituted with a small number of clutches and a more compact transmission can be provided without increasing the number of hydraulic clutches.

Moreover, the abovementioned embodiment shows an example where the seventh gear 23c is disposed rotatably with respect to the second counter shaft 3 and is engaged with the second counter shaft 3 by the third clutch 13 in LOW gear and second gear (and in reverse). However, a one way clutch 17 can be disposed along with the third clutch between the seventh gear 23c and the second counter shaft 3 in the forward range (D range) and the clutch action of the one way clutch 17 can be utilized without being engaged with the third clutch. With this type of constitution, a smooth changing action can be attained with the one way clutch 17 in the forward range (D range), while the third clutch is engaged and strong driving force and engine braking are effected in low hold gear and second hold gear (or reverse gear).

Figure 9:
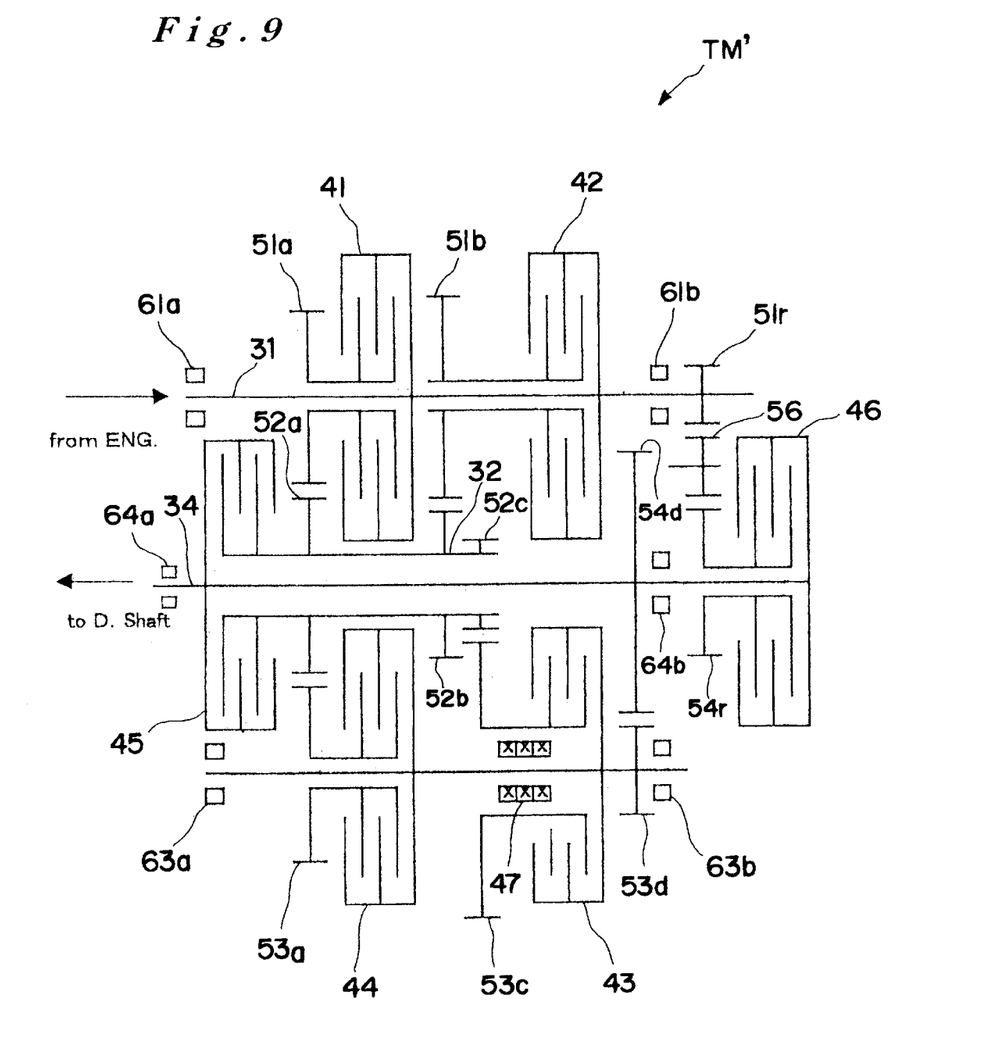
FIG. 9 is a skeleton view showing the power transmission constitution of a parallel shaft transmission relating to a second embodiment of the present invention.

Next a second embodiment of the parallel shaft transmission relating to the present invention is explained with reference to FIG. 9. In this parallel shaft transmission, driving force is transmitted to an input shaft 31 via a torque converter from an engine output shaft of a vehicle, not shown, and converted at the desired gear ratio by the transmission mechanism TM' of the parallel shaft transmission, then the driving force is transmitted to the drive wheels on either side of the vehicle via a differential, mechanism connected to the output shaft 34 of this transmission mechanism TM'.

The parallel shaft transmission mechanism TM' comprises an input shaft 31, first counter shaft 32, second counter shaft 33, and output shaft 34 that are mutually parallel; the first counter shaft 32 and output shaft 34 are established on the same axis and constituted so as to rotate relative to each other.

The input shaft 31 is supported rotatably by bearings 61a, 61b, while the left end, in the figure of the input shaft 31 is connected to the turbine of the torque converter. The input shaft 31 receives the driving force transmitted from the engine to the torque converter and rotates with the turbine of the converter. The following are disposed on the input shaft 31 in order from the left side in the figure (the torque converter side): first gear 51a, first clutch 41, second gear 51b, second clutch 42, and reverse drive gear 51r. The first gear 51a and second gear 51b are disposed rotatably on the axis of the input shaft 1 and are connected and disconnected from the input shaft 31 by the hydraulically actuated first clutch 41 and second clutch 42.

The first counter shaft 32 is disposed on the same axis as and covers the outside of the output shaft 34 and is constituted so as to rotate relatively thereto with bearings, not shown, disposed between the output shaft and the counter shaft. The following are disposed on the shaft of the first counter shaft 32 in order from the left side of the figure: fifth clutch 43, third gear 52a, fourth gear 52b, and fifth gear 52c. Each gear on this shaft is joined to the second counter shaft 32 and rotates therewith. The fifth clutch 45 hydraulically connects and disconnects the second counter shaft 32 and output shaft 34 that rotate as one.

The second counter shaft 33 is supported rotatably by bearings 63a, 63b; the following are disposed on this shaft in order from the left side: sixth gear 53a, fourth clutch 44, seventh gear 53c, third clutch 43, and eighth gear 53d. The sixth gear 53a and seventh gear 53c are disposed rotatably with respect to the second counter shaft 33 and are each connected and disconnected from the second counter shaft 33 by the hydraulically actuated fourth clutch 44 and third clutch 43. The eighth gear 53d is connected to the second counter shaft 33.

The output shaft 34 is supported rotatably by bearings 64a and 64b, while being constituted so as to rotate relatively to the first counter shaft 32 disposed on the same axis as this output shaft 34, due to bearings, not shown, therebetween. The following are disposed on the shaft of the output shaft 34 in order from the left side of the figure: fifth clutch 45, ninth gear 54d, reverse driven gear 54r, and reverse clutch 46. The ninth gear 54d is joined to this output shaft, while the reverse driven gear 54r is disposed rotatably with respect to this output shaft and connected and disconnected from the output shaft by the hydraulically actuated reverse clutch 46. The fifth clutch 45 hydraulically connects and disconnects the first counter shaft 32 and output shaft 34 disposed on the same axis.

As shown in the figure, the first gear 51a engages with the third gear 52a, the third gear 52a engages with the sixth gear 53a, the second gear 51b engages with the fourth gear 52b, the fifth gear 52c engages with the seventh gear 5c, and the eighth gear 53d engages with the ninth gear 54d. Furthermore the reverse drive gear 51r engages with the reverse driven gear 52r via the reverse idler gear 56.

In the parallel shaft transmission with the abovementioned type of constitution, the first clutch through the fifth clutch are selectively actuated in the same combinations as in the first embodiment discussed above in the state where engagement of the reverse clutch 46 is released and each gear, from LOW gear to sixth gear in the forward range (D range), is established thereby. Also, in the reverse range (R range), the engagements of the first clutch through the fifth clutch are released and rotary driving power, with a rotation opposite to that of forward gear, is transmitted to the output shaft by engagement of the reverse clutch 46.

In the case of a transmission with such a constitution, a parallel shaft transmission with six forward gears is constituted with five hydraulic clutches, like the first embodiment discussed above. Consequently, a more compact transmission can be provided, as compared to a conventional transmission with a hydraulic clutch for each gear. Also, in the present embodiment, a reverse-only clutch is disposed on the output shaft. For this reason, a compact transmission can be provided because increases to the length of the input shaft, that easily becomes long when a plurality of hydraulic clutches are disposed thereon, are avoided.

Moreover, in the present embodiment like the first embodiment discussed above, a one way clutch 47 can be disposed between the seventh gear 53c and the second counter shaft 33 and the clutch action of the one way clutch 47 can be used without engaging the third clutch 43 in the forward range (D range). With this type of constitution, smooth changing action can be attained in the forward range,(D range), while the third clutch 43 is engaged and strong driving force and engine braking can be effected in LOW hold gear and second hold gear.

Figure 10:
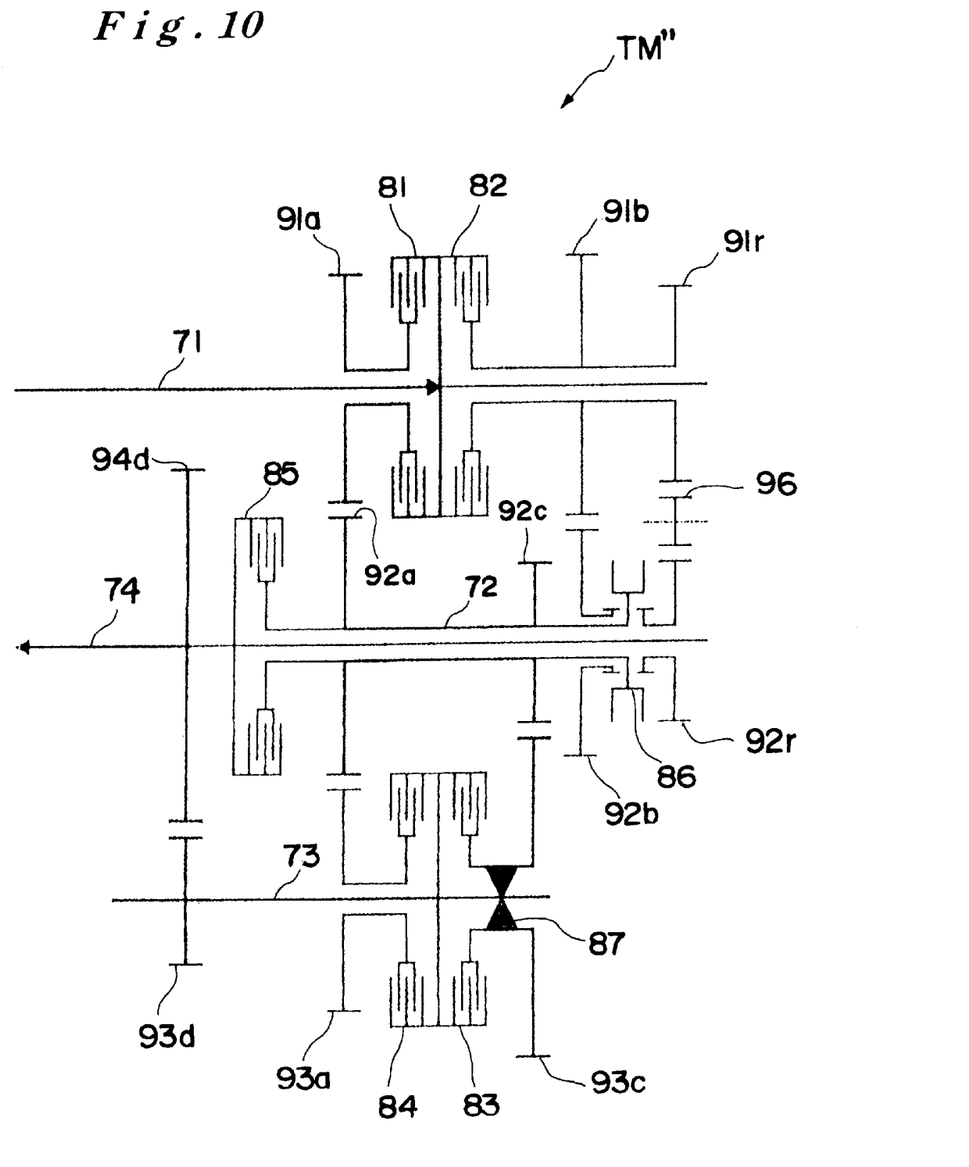
FIG. 10 is a skeleton view showing the power transmission constitution of a parallel shaft transmission relating to a third embodiment of the present invention.

Next, the third embodiment relating to the present invention is explained using FIG. 10. This embodiment is a transmission with approximately the same constitution as the first embodiment discussed above, only with a reverse selector 86 for switching between forward and reverse established on the first counter shaft 72.

The parallel shaft transmission mechanism TM' comprises an input shaft 71, first counter shaft 72, second counter shaft 73, and output shaft 74 that are parallel to each other. Transmitted from the output shaft of the engine of a vehicle, not shown, via a torque converter to the input shaft 71, the rotary driving force is converted at the desired reduction ratio by the transmission mechanism TM"; then the driving force is transmitted to the right and left drive wheels of the vehicle via a differential mechanism connected to the output shaft 74. Moreover, the first counter shaft 72 and output shaft 74 are disposed on the same axis and constituted so as to rotate relatively to each other.

The input shaft 71 is supported rotatably by bearings, not shown, and is rotated by the driving force transmitted from the engine via the torque converter. The following are disposed on the input shaft 71 in order from the left side of the figure: first gear 91a, first clutch 81, second clutch 82, second gear 91b, and reverse drive gear 91r. The first gear 91a is disposed rotatably on the shaft of the input shaft 1 and connected and disconnected to the input shaft 71 by the hydraulically actuated first clutch 81. The second gear 91b and reverse drive gear 91r are joined together and disposed rotatably on the input shaft 71 and connected and disconnected from the input shaft 71 by the hydraulically actuated second clutch 82.

The first counter shaft 72 is disposed on the same axis as and covering the outside of the output shaft 74 and is constituted so as to rotate relatively thereto due to bearings, not shown, disposed between the counter shaft and the output shaft 74. The following are disposed on the first counter shaft 72 in order from the left side of the figure: fifth clutch 85, third gear 92a, fifth gear 92c, fourth gear 92b, reverse selector 86 for switching between forward and reverse, and the reverse driven gear 22r. The third gear 92a and fifth gear 92c are joined to the second counter shaft 72 and rotate as one therewith. The fourth gear 92b and reverse driven gear 92r are disposed rotatably on the second counter shaft; the gear selected by the reverse selector (for example, dog toothed clutch or servo-synchro) 86 engages with the second counter shaft 72 and rotates and is driven by this shaft. Also, the fifth clutch 85 hydraulically connects and disconnects the second counter shaft 72 and output shaft 74.

The second counter shaft 73 is supported rotatably by bearings, not shown; the following are disposed on the shaft from the left side of the figure: eighth gear 93d, sixth gear 93a, fourth clutch 84, third clutch 83, and seventh gear 93c. The sixth gear 93a and seventh gear 93c are disposed rotatably with respect to the second counter shaft 73 and are each connected and disconnected from the second counter shaft 73 by the hydraulically actuated fourth clutch 84 and third clutch 83. The eighth gear 93d is joined to the second counter shaft 73.

The output shaft 74 is supported rotatably with respect to the case of the transmission by bearings, not shown, while being disposed rotatably relative to the first counter shaft 72 by bearings, not shown, between the output shaft and the first counter shaft 72 disposed on the same axis and outside of the output shaft 74. The ninth gear 94d and fifth clutch 85 are disposed in that order from the left side of the drawing on the shaft of the output shaft 74; the ninth gear 94d is joined to the output shaft 74. The fifth clutch 85 hydraulically connects and disconnects the output shaft 74 and first counter shaft 72.

As shown in the drawing, the first gear 91a engages with the third gear 92a, the third gear 92a engages with the sixth gear 93a, the second gear 91b engages with the fourth gear 92b, the fifth gear 92c engages with the seventh gear 93c, and the eighth gear 93d engages with the ninth gear 94d. Also, the reverse drive gear 91r engages with the reverse driven gear 92r via the reverse idler gear 96.

In the parallel shaft transmission with the abovementioned type of constitution, the first clutch through the fifth clutch are selectively actuated in the same combinations as in the first embodiment discussed above in the state where the reverse selector 86 is moved to the left, and each gear, from LOW gear to sixth gear in the forward range (D range), is established thereby. Also, in the reverse range (R range), the reverse selector 86 is moved to the right, and the second clutch 82 and third clutch 83 are engaged, whereby rotary driving power, with a rotation opposite to that of forward gear, is transmitted to the output shaft 74.

In the case of a transmission with such a constitution, a parallel shaft transmission with six forward gears is constituted with five hydraulic clutches, like the first embodiment discussed above. Consequently, a more compact transmission can be provided, as compared to a conventional transmission with a hydraulic clutch for each gear. Also, in the present embodiment, a reverse selector 86 is disposed on the first counter shaft. For this reason, a compact transmission can be provided because increases to the length of the input shaft, that easily becomes long, are avoided and because a total of seven gears, six forward gears and a reverse gear (a total of nine gears with three reverse gears is also possible) are constituted with five hydraulic clutches.

The invention being thus described, it will be obvious that the same may be varied in many ways. Such variations are not to be regarded as a depart from the spirit and scope of the invention, and all such modifications as would be obvious to one skilled in the art are intended to be included within the scope of the following claims.

RELATED APPLICATIONS

This application claims the priority of Japanese Patent Application No.11-159120 filed on Jun. 7, 1999, which is incorporated herein by reference.

What is claimed is:

1. A parallel shaft transmission comprising:
an input shaft, a first counter shaft, a second counter shaft and an output shaft which are extended in parallel, said first counter shaft being arranged coaxially with said output shaft so as to be rotatable relatively thereto;

two sets of first change gear trains comprising first and second change drive gears established rotatably on said input shaft, and first and second change driven gears established rotatably on said first counter shaft and engaging with said first and second change drive gears respectively;

first and second clutch means established on said input shaft for connecting and disconnecting said input shaft to and from said first and second change drive gears;

two sets of second change gear trains comprising third and fourth change drive gears established rotatably on said first counter shaft, and third and fourth change driven gears established rotatably on said second counter shaft and engaging with said third and fourth change drive gears respectively;

third and fourth clutch means established on said second counter shaft for connecting and disconnecting said second counter shaft to and from said third and fourth change driven gears;

a third change gear train comprising fifth change drive gear established jointly on said second counter shaft and a fifth change driven gear established jointly on said output shaft and engaging with the fifth change drive gear; and fifth clutch means established between said first counter shaft and said output shaft for connecting and disconnecting said first counter shaft to and from said output shaft.

2. The parallel shaft transmission, according to claim 1, wherein a reverse change gear train is established between said input shaft and said first counter shaft;

and reverse clutch means is disposed on said input shaft for connecting and disconnecting said input shaft to and from the reverse drive gears constituting said reverse change gear train.

3. The parallel shaft transmission, according to claim 2, wherein a selector clutch is disposed in series with said second clutch means between said second change drive gear and said input shaft; and wherein said selector clutch and said reverse clutch means are selectively operated with a reverse selector means disposed on said input shaft.

4. The parallel shaft transmission, according to claim 1, wherein a reverse change gear train is disposed between said input shaft and said first counter shaft;

and wherein reverse clutch means is disposed on said first counter shaft for connecting and disconnecting said first counter shaft to and from the reverse driven gears constituting said reverse change gear train.

5. The parallel shaft transmission, according to claim 4, wherein a selector clutch is disposed between said second change driven gear and said first counter shaft; and wherein said selector clutch and said reverse clutch means are selectively operated with a reverse selector means disposed on said first counter shaft.

* * * * *